3,303,076
METHOD OF MAKING LAMINATED POLY-
URETHANE STRUCTURES
Frank A. Carlson, Jr., Berkeley Heights, N.J., and Dorrill K. Hatch, Jr., Kirkwood, and Robert P. Whittier, Ladue, Mo., assignors to Monsanto Company, a corporation of Delaware
Filed Oct. 25, 1962, Ser. No. 233,035
2 Claims. (Cl. 156—79)

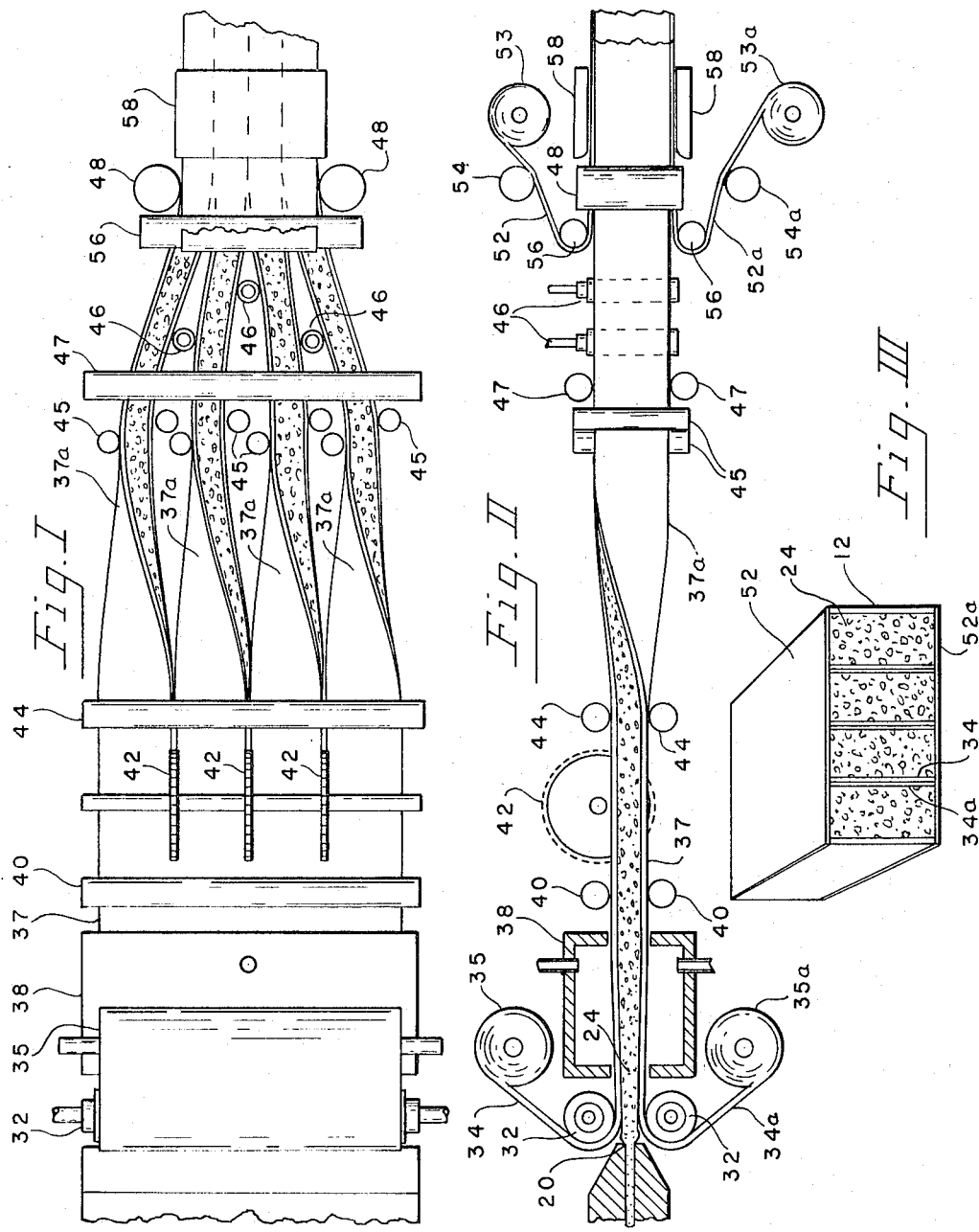
Feb. 7, 1967    F. A. CARLSON, JR., ETAL    3,303,076
METHOD OF MAKING LAMINATED POLYURETHANE STRUCTURES
Filed Oct. 25, 1962
FRANK A. CARLSON JR. – DORRILL K. HATCH JR.–*INVENTORS.*
ROBERT P. WHITTIER.
BY *James C. Sopmasini*
PATENT AGENT.

This invention relates to novel laminated structures and to a method for preparing same.

This application is a continuation-in-part of copending application S.N. 740,712, filed June 9, 1958, now U.S. Patent No. 3,070,475.

It is an object of this invention to provide rigid, mechanically strong, lightweight laminated structures utilizing urethane foam polymers suitable for use as load-bearing panels.

A further object of this invention is to provide an efficient and continuous method for preparing such laminated structures.

Other objects and advantages of the invention will be apparent from the following detailed description thereof when read in conjunction with the accompanying drawings in which:

FIG. I is a diagrammatic top-plane view with parts broken away of an apparatus for preparing such laminated structures;

FIG. II is a side elevation partially in section of the apparatus depicted in FIG. I; and FIG. III is a perspective end view of a laminated structure prepared in the manner illustrated in FIGS. I and II.

The laminated structures of the present invention consist of a pair of spaced-apart parallel facing sheets or skins which are laminated to a reinforced core of a lightweight foamed urethane polymer. The foamed urethane polymer core is reinforced by a plurality of substantially equidistant continuous parallel ribbons or ribs which run directly across the length of the foamed polymer core and which are in perpendicular relationship to the facing sheets. As illustrated in FIG. III, the facing sheets consist of paper sheets 52 and 52a. The reinforced foamed urethane polymer laminate is designated as 12 and consists of individual sections of foamed urethane polymer 24—24 which are joined to a series of substantially equidistant parallel reinforcing ribs. The reinforcing ribs may be of a single unitary construction or may consist of a pair of paper sheets or ribbons 34 and 34a which are cemented together to constitute a unitary structure.

Referring to FIGS. I and II, a foamed urethane polymer composition is delivered from a reactant mixer (not shown) through a nozzle or rectangular shaped orifice 20. Orifice 20 is positioned very close to the nip of the temperature controlled rolls 32—32.

The discharge pressure at orifice 20 forces the urethane foam between rolls 32—32 simultaneously resulting in formation of a urethane sheet or core 24 and engagement of paper sheets 34 and 34a with the top and bottom surfaces of the newly formed core 24. The urethane core is hot enough at this point such that the foamed urethane polymer will be forced into the interstices of the paper to form a strong bond between the surfaces of the polymer core and the paper sheets. Rolls 32—32 are temperature controlled to maximize adhesion at this point. The temperature of rolls 32—32 will of course vary depending to a large extent on the discharge rate of the urethane foam but will generally be set below the temperature of the urethane core measured at this point and preferably just below the melting point of the urethane foam. In addition, the clearance between rolls 32—32 should be adjustable to permit changes in thickness of the core 24. Sheets of paper 34 and 34a which are drawn over rolls 32—32 are supplied from rolls 35 and 35a respectively. If a nozzle is used instead of discharge orifice 20 shown in FIGURE I, the nozzle should be equipped with means to permit the nozzle to traverse the length of the nip defined by rolls 32—32 in a back and forth pattern thereby forming core 24. A nozzle type apparatus is described in U.S. Patent 2,764,565.

The assembly of foamed urethane polymer sheet or core 24 and paper sheets 34 and 34a is designated as 37. At this point the assembly 37 may pass directly to cutting means as described below or may be post expanded by post expanding means. Post expansion is sometimes desirable for the production of a laminate of minimum density. Post expansion may be accomplished as shown in FIGURE I by applying a vacuum to the upper and lower surfaces of sheets 34 and 34a respectively within vacuum chamber 38, the vacuum producing means not being shown. However, it is possible and sometimes desirable to use other post expanding means such as substituting heating means for the vacuum chamber 38. When heating means are used, a secondary gas forming agent is employed in addition to the foam initiating agent. The secondary gas forming agent would permit post expansion at the higher temperature imparted to assembly 37 by the heating means.

Upon leaving the post expanding means or vacuum chamber 38, the assembly 37 is driven by drive rolls 40—40 through a plurality of vertical cutting saw blades 42—42 and cut into a series of narrower assemblies 37a—37a. For clarity of illustration only three saw blades are shown, but in actual practice a substantially larger number of blades will be employed. The flexible assemblies 37a—37a are advanced by drive rolls 44—44, twisted through an angle of 90° and supported in this up-ended position by a plurality of rotatable fingers 45—45, 46—46 and vertically positioned rolls 48—48. As the up-ended assemblies 37a—37a are advanced by drive rolls 47—47, adhesive is applied to one surface of each of the assemblies by fingers 46—46. The adhesive is supplied to the surfaces of the fingers by conventional means not shown. For example, the surfaces of the fingers may be perforated and a liquid adhesive chamber may be provided within the center of the fingers to deliver adhesive through the surface perforations. The inwardly directed pressure applied upon the up-ended assemblies 37a—37a by vertical rolls 48—48 causes the assemblies to adhere together to form a unified foamed urethane polymer core which has a series of equidistant parallel reinforcing ribs running throughout the core. Paper sheets 52 and 52a are withdrawn from rolls 53 and 53a and an adhesive is applied to one surface thereof by rolls 54 and 54a. The adhesive-coated paper sheets 52 and 52a are drawn over pressure-applying rolls 56—56 and pressed against the top and bottom surfaces of the reinforced foamed urethane polymer core by platens 58—58. The finished laminated structure is then delivered to a cutting station not shown.

The following example is set forth to illustrate more clearly the principle and practice of this invention to those skilled in the art.

*Example I*

A laminated structure is prepared employing an apparatus of the type illustrated in FIG. I. The orifice 20 measures 8″ x 0.040″. The rolls 32—32 are 22″ long and 4″ in diameter. The clearance between rolls 32—32 is 0.25″ and the distance between extruder die orifice 20 and the nip of rolls 32—32 is 0.25″.

A urethane foam polymer, prepared from 100 parts of a volumetric mixture consisting of 16 mols of adipic acid, 16 mols of diethylene glycol, 1 mol of trimethylol propane and 25 parts by volume of tolylene diisocyanate utilizing a foaming agent consisting of 3 parts by volume of the adipic acid ester of N-diethylaminoethanol, 2 parts by volume of ammonium oleate and 1.2 parts by volume of water, is delivered to and through the rectangularly shaped orifice 20 at a temperature of about 175° F. and at a rate of about 47 lbs. per hour. The rolls 32—32 are adjusted to rotate at a speed to permit buildup of a sheet of urethane foam at the nip of the rolls which is slightly larger than the clearances between said rolls. If desired the thickness of the urethane sheet at this point may be set at twice the distance or the clearance between the rolls 32—32.

Sheets 34 and 34a which are about 22" wide and consist of 65 lb. kraft paper are drawn over rolls 32—32 which are temperature controlled to about 150° F. The assembly is then fed through the vacuum chamber 38 which is 6 ft. long and maintained under a continuous vacuum of −20 p.s.i. The foamed polyurethane sheet in assembly 37, as it is discharged from heater 38, is about 0.50" thick and has a density of about 2.5 lb./ft.$^3$.

The assembly 37 is trimmed to a 20" width and passed through 9 vertical saw blades set 2" apart so as to provide 10 narrower assemblies 37a—37a which are exactly 2" wide. A cold-setting phenol-resorcinol-formaldehyde adhesive is applied to one paper surface of each of assemblies 37a—37a at a rate of 0.35 lb. per 1,000 sq. in. Paper sheets 52 and 52a, which consist of 125 lb. kraft paper (having a thickness of about 0.013") are coated with a cold-setting phenol-resorcinol-formaldehyde adhesive at a rate of 0.70 lb. per 1,000 sq. in. and applied to the top and bottom surfaces of the reinforced foamed polyurethane sheet.

The laminates of this invention, because of their unique construction and the materials included therein, have low vapor transmission characteristics and high strength/weight ratios. In a preferred embodiment of the invention, the finished laminates vary in thickness from about 0.25 to about 4 inches or more preferably 0.5 to 4 inches and may be of virtually any length and width.

The facing sheets or skins of the laminates may be fabricated from paper, metal, plastic sheets fabricated from resins such as polystyrene, polyethylene, polyvinyl chloride, etc., phenolic resins, etc., wood, paper impregnated with a thermoset melamine, urea of phenolic resin, textile fabrics, or similar materials.

The foamed urethane polymer included in the reinforced foamed urethane polymer core is ordinarily prepared by the addition of a foaming agent such as water or aqueous solutions to a reaction mixture of polyethers and/or polyesters and polyisocyanate. The characteristics of the urethane foams will be affected by the active or functional chemical groupings at given or specified intervals on the various polymer chains. U.S. Patents 2,894,919 and 2,850,464 set out various types of reactants that may be used to prepare cellular polyurethanes and some of the characteristics and properties that may be expected.

Various types of mixing equipment may be used to initiate the foaming reaction. Suitable methods for the continuous preparation of foamed urethanes are described in U.S. Patents 2,764,565 and 2,993,869.

The foamed plastics used in the practice of this invention should have a low specific gravity and especially preferred are those foamed polymers having a specific gravity of less than about 0.2 and more preferably less than about 0.1. Foamed urethane polymers of a suitable density for use in the present invention can be purchased commercially in sheet form or can be formed in a continuous manner as described above.

The reinforcing members provided in the foamed urethane polymer core may be fabricated from paper, wood, plastic sheets, metal, and in general materials of the same type employed in the facing sheets or skins. Such reinforcing members may consist of a single sheet of material or two or more sheets of material cemented together to form a unitary structure as illustrated in the drawings. In a preferred embodiment of the invention, the maximum thickness of the reinforcing sheets is about 0.030 inch and the total volume of said reinforcing sheets constitutes a maximum of about 5.0% of total volume of the foamed urethane polymer core.

The laminates of the invention have utility as partitions and load-bearing members in diverse engineering structures such as wall panels, roof panels, subflooring, etc. Typical laminates of the invention in which both facing sheets or skins are 0.125" thick interior grade hardboard (untempered Masonite board) are set forth in Table I. All of the panels exhibit good structural properties, particularly compressive and flexural strength.

TABLE I

|  | Laminate Identification | | | |
| --- | --- | --- | --- | --- |
|  | A | B | C | D |
| Reinforced Core Structure: |  |  |  |  |
| Core Thickness (in.) | 2 | 2 | 2 | 1 |
| Reinforcing Sheet Material, Kraft Paper | ($^1$) | ($^2$) | ($^2$) | ($^2$) |
| Thickness of Reinforcing Sheet (in.) | 0.013 | 0.026 | 0.026 | 0.026 |
| Distance Between Reinforcing Sheets (in.) | 1.0 | 0.5 | 0.25 | 0.25 |
| Foam Density, lbs./ft.$^3$ | 1.1 | 1.6 | 3.9 | 3.9 |

$^1$ Basis Weight 125 lbs./ream.
$^2$ 2 Sheets of 125 lb. Kraft Paper Cemented Together.

The above descriptions and particularly the examples are set forth by way of illustration only. Many other variations and modifications of the invention will be apparent to those skilled in the art and can be made without departing from the spirit and scope of the invention herein described.

What is claimed is:

1. A continuous process for preparing a rigid, mechanically strong, lightweight laminate structure which comprises the steps; (1) delivering a foamed urethane polymer composition from a reactant mixer under pressure through an orifice and between a continuously advancing pair of covering sheets, each of said covering sheets being supported by a temperature controlled roll to adhere said sheets to the foamed urethane, (2) post expanding the foamed urethane polymer composition and the covering sheets by passing the assembled through a vacuum chamber which acts to draw the covering sheets apart a limited distance before release, (3) cutting the continuous assembly of the foamed urethane polymer composition and the covering sheets into a plurality of narrower assemblies of substantially equal width, (4) turning each of said narrower assemblies through an angle of 90 degrees, and (5) pressing said narrower assemblies into touching relationship, (6) adhesively joining said narrower assemblies to form a core of a foamed urethane polymer that is reinforced with a plurality of substantially equidistant parallel reinforcing sheets which run throughout the length of the sheet, and (7) laminating covering sheets to the top and bottom surfaces of their reinforced foamed urethane polymer core.

2. A continuous process for preparing a rigid, mechanically strong, lightweight laminate structure which comprises the steps; (1) delivering a foamed urethane polymer composition, containing a gas forming agent, from a reactant mixer underpressure through an orifice and between a continuously advancing pair of covering sheets each supported by a temperature controlled roll to adhere said sheets to the foamed urethane polymer, (2) post expanding the foamed urethane polymer composition and the covering sheets by applying heat to said composition and sheets to convert a secondary gas forming agent to a gaseous state, (3) cutting the continuous assembly of the foamed urethane polymer composition and the covering sheets into a plurality of narrower assemblies of substantially equal width, (4) turning each of said narrower assemblies through an angle of 90 degrees, (5) pressing said narrower assemblies into touching relationship, (6) adhesively joining said narrower assemblies to form a core of a foamed urethane polymer that is reinforced with a plurality of substantially equidistant parallel reinforcing sheets which run throughout the length of the sheet, and (7) laminating covering sheets to the top and bottom surfaces of their reinforced foamed urethane polymer core.

References Cited by the Examiner

UNITED STATES PATENTS

| | | |
|---|---|---|
| 2,942,285 | 6/1960 | Gray. |
| 2,956,310 | 10/1960 | Roop et al. |
| 3,003,810 | 10/1961 | Kloote et al. |
| 3,061,885 | 11/1962 | Rogers et al. _____ 264—50 |
| 3,070,475 | 12/1962 | Carlson et al. _____ 161—69 |
| 3,174,887 | 3/1965 | Voelker _____ 156—79 |

EARL M. BERGERT, *Primary Examiner.*

R. I. SMITH, M. L. KATZ, *Assistant Examiners.*